United States Patent [19]
Girard

[11] Patent Number: 5,771,136
[45] Date of Patent: Jun. 23, 1998

[54] SUSPENSION ASSEMBLY FOR MOUNTING A HEAD SLIDER HAVING A FLEXURE WITH A SHOCK LIMITER

[75] Inventor: Mark T. Girard, Hutchinson, Minn.

[73] Assignee: Hutchinson Technology Incorporated, Hutchinson, Minn.

[21] Appl. No.: 653,937

[22] Filed: May 23, 1996

[51] Int. Cl.$^6$ ..................................................... G11B 5/48
[52] U.S. Cl. ............................................................ 360/104
[58] Field of Search ..................................... 360/103, 104

[56] References Cited

U.S. PATENT DOCUMENTS

| | | | |
|---|---|---|---|
| 3,349,384 | 10/1967 | Kohn | 360/104 |
| 4,204,235 | 5/1980 | Stollorz | 360/103 |
| 4,206,489 | 6/1980 | Manzke et al. | 360/105 |
| 4,724,500 | 2/1988 | Dalziel | 360/103 |
| 4,777,551 | 10/1988 | Seki et al. | 360/104 |
| 4,807,070 | 2/1989 | Isozaki et al. | 360/104 |
| 4,939,611 | 7/1990 | Connolly | 360/128 |
| 4,943,881 | 7/1990 | Isozaki et al. | 360/104 |
| 5,012,369 | 4/1991 | Owe et al. | 360/104 |
| 5,185,683 | 2/1993 | Oberg et al. | 360/104 |
| 5,329,504 | 7/1994 | Mukawa | 369/13 |
| 5,333,085 | 7/1994 | Prentice et al. | 360/104 |
| 5,353,181 | 10/1994 | Frater et al. | 360/104 |
| 5,535,075 | 7/1996 | Takahashi et al. | 360/105 |

FOREIGN PATENT DOCUMENTS

| | | |
|---|---|---|
| 60-167172 (A) | 8/1985 | Japan . |
| 62-97168 (A) | 5/1987 | Japan . |
| 62-145583 (A) | 6/1987 | Japan . |
| 62-231462 (A) | 10/1987 | Japan . |
| 1-62876 (A) | 3/1989 | Japan . |
| 1-70977 (A) | 3/1989 | Japan . |
| 2-44563 (A) | 2/1990 | Japan . |
| WO 92/05542 | 4/1992 | WIPO . |

Primary Examiner—Stuart S. Levy
Assistant Examiner—William J. Klimowicz
Attorney, Agent, or Firm—Faegre & Benson LLP

[57] ABSTRACT

A suspension assembly for supporting a slider over a disk surface within a rigid disk drive includes a load beam with a flexure at a distal end of the load beam, the flexure of the type having a cantilever portion with a free-end and a limiter for restricting the range of flexure of the free-end of the cantilever portion. The flexure of the present invention has a cantilever portion provided with an integral limiter and stop surface. The limiter is preferably connected with the flexure by a bend. More preferably, a single bend of about 90 degrees is provided for each limiter. In accordance with the method of the present invention, a suspension assembly is made by forming a flexure having a cantilever portion with a free-end and a limiter from the same sheet material, and forming the limiter so that an engagement surface thereof is spaced from a stop surface of the flexure so that movement of the free-end of the cantilever portion in one direction will cause the limiter engagement surface to contact the stop surface of the flexure. Specifically, the step of forming the cantilever portion and the limiter from the same material preferably comprises an etching operation. Moreover, the forming operation preferably comprises a bending operation to form a single bend in the limiter of about 90 degrees.

18 Claims, 10 Drawing Sheets 5,771,136

SUSPENSION ASSEMBLY FOR MOUNTING A HEAD SLIDER HAVING A FLEXURE WITH A SHOCK LIMITER

TECHNICAL FIELD

The present invention is directed to a suspension assembly for supporting a head slider relative to a rigid disk drive, the suspension assembly having a shock limiter. More particularly, the shock limiter limits the movement of a free end of a cantilever portion of a flexure to which a head slider is to be resiliently mounted.

BACKGROUND OF THE INVENTION

Storage devices typically include a head for reading and/or writing data onto a storage medium, such as a disk within a rigid disk drive. An actuator mechanism is used for positioning the head at specific locations or tracks in accordance with the disk drive usage. Linear and rotary actuators are known based on the manner of movement of the head. Suspension assemblies are provided between the actuator and the head and support the head in proper orientation relative to the disk surface.

In a rigid disk drive, suspension assemblies are provided which support a head to "fly" over the surface of the rigid disk when it is spinning. Specifically, the head is typically located on a slider having an aerodynamic design so that the slider flies on an air bearing generated by the spinning disk. In order to establish the fly height, the suspension assembly is also provided with a spring force counteracting the aerodynamic lift force.

A suspension assembly of the type used in a rigid disk drive comprises the slider and a load beam. Load beams normally have an actuator mounting portion, a rigid region, a spring region between the actuator mounting region and the rigid region for providing the aforementioned spring force, and a flexure at an end of the load beam distal from the actuator mounting portion to which the slider is mounted and which permits pitch and roll movements of the slider to follow disk surface fluctuations. Many types of flexures have been developed including flexures that are integrated into the design of the load beam and those formed as a separate element and fixed to the rigid region of the load beam.

In order to permit pitch and roll movements, flexures typically include a cantilever portion having a free end which is resiliently moveable relative to the remainder of the flexure. Depending on the design, more than one moveable free end may be provided. In some cases, the load beam includes a load portion that interacts with the flexure to provide a point load, such as by way of a dimple, to the flexure about which pitch and roll movements can occur. In other types of flexures, connecting portions or bridges between a slider mounting portion of the flexure and the remainder of the flexure or load beam are used to define axes of pitch and roll movements.

As disk drives are being designed having smaller disks, closer spacing and increased storage densities, smaller and thinner suspension assemblies are required. These smaller and thinner suspension assemblies are more susceptible to be damaged if the disk drive is subjected to a shock load. Moreover, with increased disk storage density, it is necessary for the suspension assembly to hold the slider and head in flight very close to the disk surface, but to still permit pitch and roll movement. Thus, it is becoming increasingly more important to design the suspension assembly so that it is less susceptible to shock loads. Not only is it desirable to prevent damaging contact between the head slider and a disk surface, which could damage the slider and/or the disk surface, but also to prevent permanent deformation of any part of the suspension assembly as a result of a shock load. As flexures get smaller and thinner, there is a greater chance that a shock load could cause permanent deformation of the flexure even when the suspension assembly is parked outside of the disk surface when not in use, such as on a conventional comb structure.

Mechanisms have been developed for limiting the movement of a free end of a cantilever portion of a flexure for protection against damage under shock loads. One such mechanism is disclosed in U.S. Pat. No. 4,724,500 to Dalziel. Described is a limiter structure comprising a specially designed slider having raised shoulders to which one or more elements are secured to overlap at least a portion of a top surface of the load beam to which the flexure thereof is attached. The Dalziel structure is rather complicated in that an assembly of components is required, including the specially designed slider and in that the structure adds significantly to the weight, height and difficulty of manufacture and assembly of the suspension. The added structure would be particularly undesirable in the design of smaller suspension assemblies.

Another motion limiter is disclosed in U.S. Pat. No. 5,333,085 to Prentice et al. In this case, a tab is specifically formed extending from a free end of the cantilever portion of a flexure. The tab is fitted through an opening of the load beam to oppose a stop surface on the opposite side of the load beam than the side to which the flexure is mounted. Although the Prentice et al. mechanism does not significantly change the weight or height of the overall suspension assembly, it does require special manufacturing and assembly steps. To assemble the flexure to the load beam, the tab must first be moved through the opening and then the flexure needs to be longitudinally shifted relative to the load beam to its mounting position. Moreover, the tab formation comprises multiple bends, the degree of each bend being critical in the definition of the spacing between the tab and the stop surface. As set out above, the spacing would be predetermined to prevent permanent yielding of the flexure and to prevent damaging or catastrophic contact between the head slider and the disk surface (catastrophic contact includes, for example, contact of an edge or corner of the slider head with the disk surface, as opposed to substantially planar contact which is generally considered non-damaging). By the Prentice et al. design, any error, including manufacturing tolerances, in the formation of even one bend can significantly affect the ultimate spacing of the stop mechanism. Thus, the forming operation must be precisely controlled and monitored.

SUMMARY OF THE INVENTION

The present invention is directed to a suspension assembly including a limiter mechanism that overcomes the shortcomings and disadvantages associated with the prior art. The present invention includes the provision of a limiter that is simpler in construction and is less susceptible to tolerance variations of the forming operation.

In particular, one or more limiters can be formed integral with the flexure for simplifying the flexure construction. Moreover, both the limiter and its associated stop surface are provided as a part of the flexure. That is, the limiter is self-contained with the flexure. Thus, assembly is simplified even in the case of the flexure being constructed as a separate component from the load beam. The need to coordinate the engagement surface of the limiter of one component with a stop surface of another component during assembly is eliminated.

Another advantage is that the spacing of the limiters is defined primarily by the manner of which the limiters are defined and configured from the flexure material and less dependent on its forming (bending) operation. By the construction and method of making of the present invention, each limiter requires only a single bend, wherein manufacturing tolerances of the bending operation have little affect on the ultimate spacing of the limiters.

The aforementioned advantages of the present invention can be achieved by a suspension assembly for supporting a slider over a disk surface within a rigid disk drive having a load beam with a flexure at a distal end of the load beam, the flexure of the type having a cantilever portion with a free-end and a limiter for restricting the range of flexure of the free-end of the cantilever portion. In accordance with the present invention, a flexure having a cantilever portion is provided with an integral limiter and stop surface. The limiter is preferably connected with the flexure by a bend. More preferably, a single bend of about 90 degrees is provided for each limiter.

Also in accordance with the present invention, the aforementioned advantages are achieved by a method of making a suspension assembly including the steps of forming a flexure having a cantilever portion with a free-end and a limiter from the same material, and forming the limiter so that an engagement surface thereof is spaced from a stop surface of the flexure so that movement of the free-end of the cantilever portion in one direction will cause the limiter engagement surface to contact the stop surface of the flexure. Specifically, the step of forming the cantilever portion and the limiter from the same material preferably comprises an etching operation. Moreover, the forming operation preferably comprises a bending operation to form a single bend in the limiter of about 90 degrees.

DETAILED DESCRIPTION OF THE PREFERRED EMBODIMENTS

Figure 1:
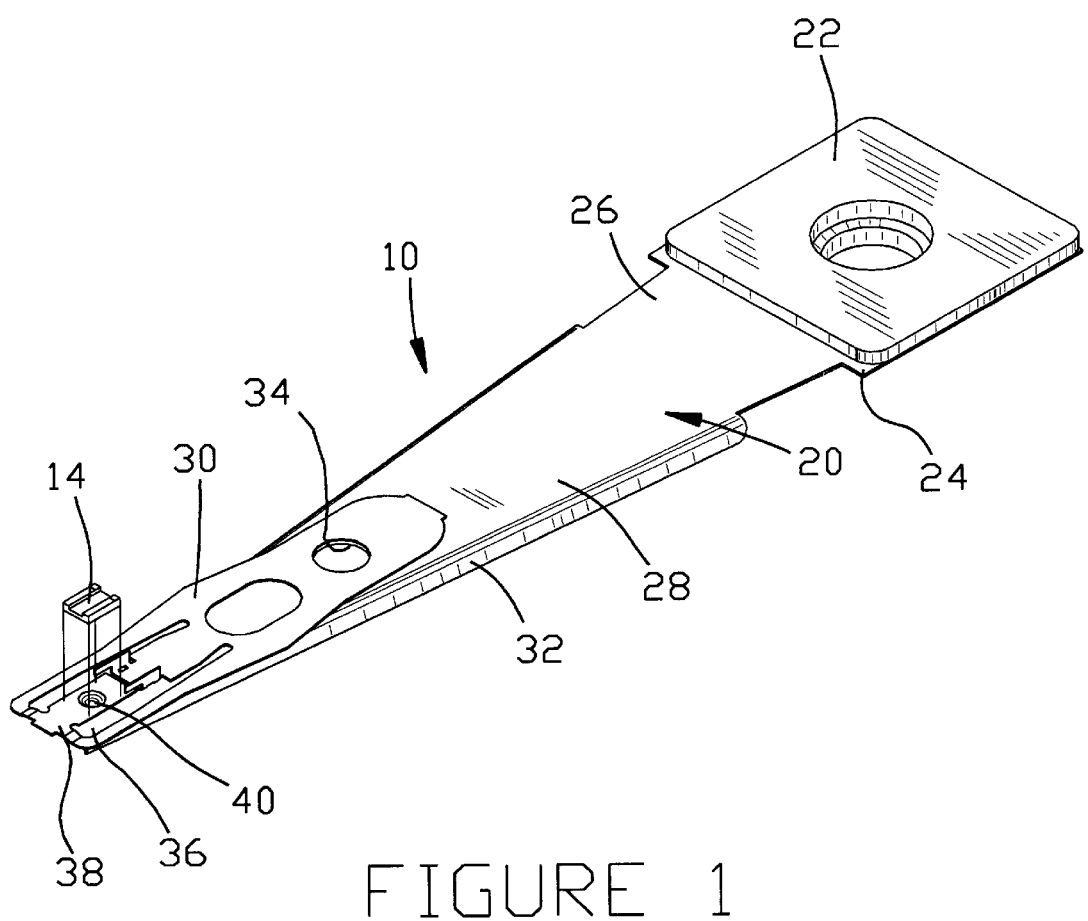
FIG. 1 is an isometric view of a suspension assembly in accordance with the present invention having a flexure contained shock limiter.
Figure 10:
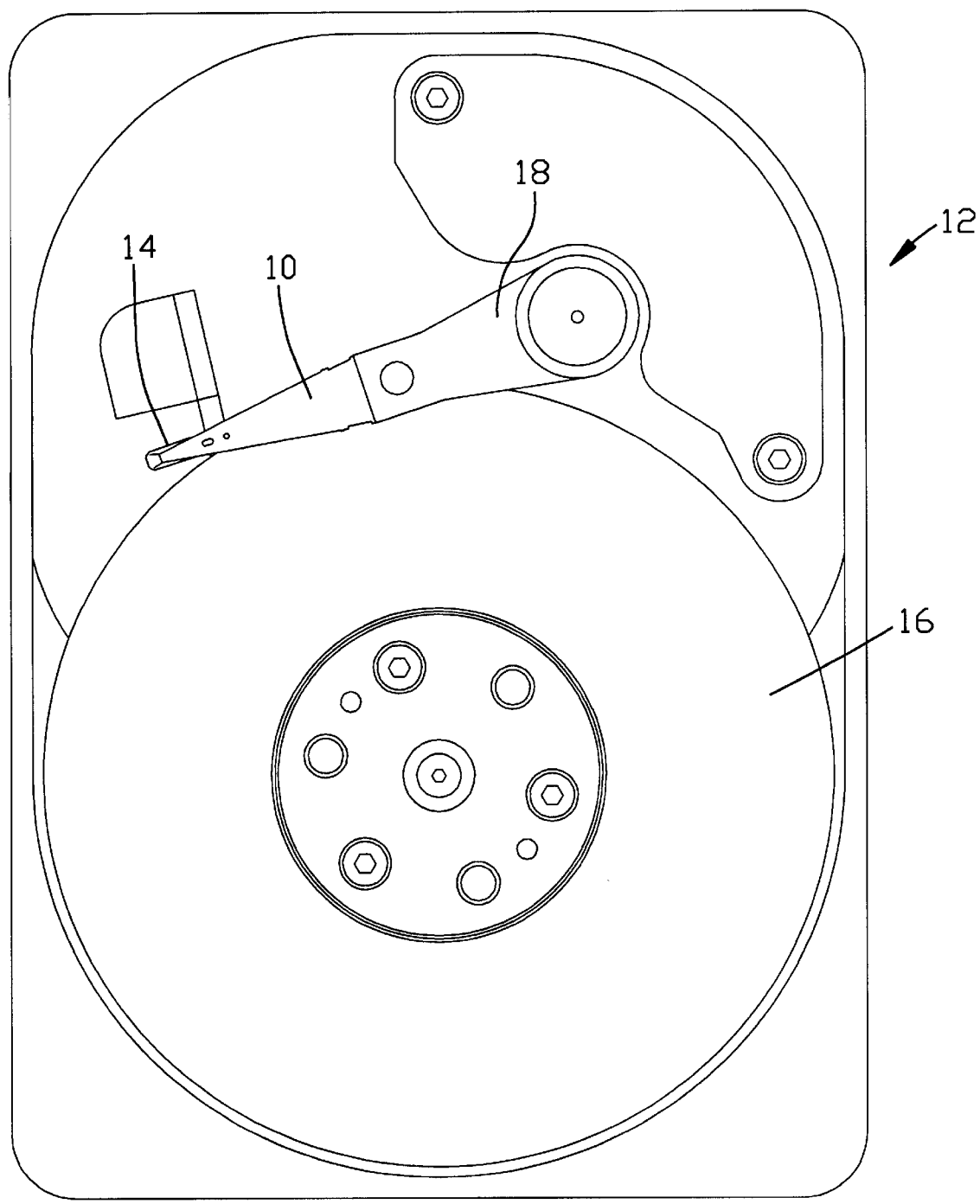
FIG. 10 is a plan view of the rigid disk drive assembly including an actuator and at least one rigid disk, the actuator connected with a suspension assembly in accordance with the present invention.

With reference now to the drawings, wherein like components are labeled with like numerals throughout the several Figures, and initially to FIGS. 1 and 10, a suspension assembly 10 is illustrated which is designed for use within a rigid disk drive assembly 12 or similar dynamic storage device. Suspension assemblies 10, in accordance with the present invention, is of the type that supports a slider 14 at a fly height above a rigid disk 16 during operation, as described above in the Background section. The suspension assembly 10 is illustrated in FIG. 10 connected with a rotary actuator 18, as conventionally known, for accessing data tracks provided on the surface of rigid disk 16. Suspension assembly 10 could otherwise be utilized with a linear type actuator, as also well known.

As shown in FIG. 1, the suspension assembly 10 basically comprises a load beam 20, the slider 14, and a base plate 22. Base plate 22 can be conventionally fixed to an actuator mounting region 24 of the load beam 20, such as by welding. The load beam 20 further comprises a spring region 26, a rigid region 28, and a flexure 30. The spring region typically includes a bend or radius to provide the load at the distal tip of the load beam to counteract the aerodynamic lift force and define the fly height. Rigid region 28 is provided with stiffening rails 32, as are well known, to enhance stiffness properties.

In the FIG. 1 embodiment, the flexure 30 is constructed as a separate element from the rigid region 28 of the load beam 20. Flexure 30 can be conventionally connected to the rigid region 28 by welding. Alignment hole 34 of the flexure 30 ensures accurate alignment of the flexure 30 to the rigid region 28, as known. The flexure 30 is secured, such as by welding, to the rigid region 28 at a distal portion of the load beam 20 from the base plate 22. Rigid region 28 further includes a load portion 36 at its distal end for transferring the predetermined load to a cantilever portion 38 of flexure 30. A dimple 40 is shown in FIG. 1 from its concave side extending toward the load portion 36 of the load beam 20 and provides a specific manner by which the load is transferred from load portion 36 to the cantilever portion 38 of the flexure 30 and to permit pitch and roll movements of the cantilever portion 38, as conventionally known. A surface of the cantilever portion 38, as shown, provides a slider mounting surface to which the slider 14 is attached, such as by adhesives or the like.

Figure 2:
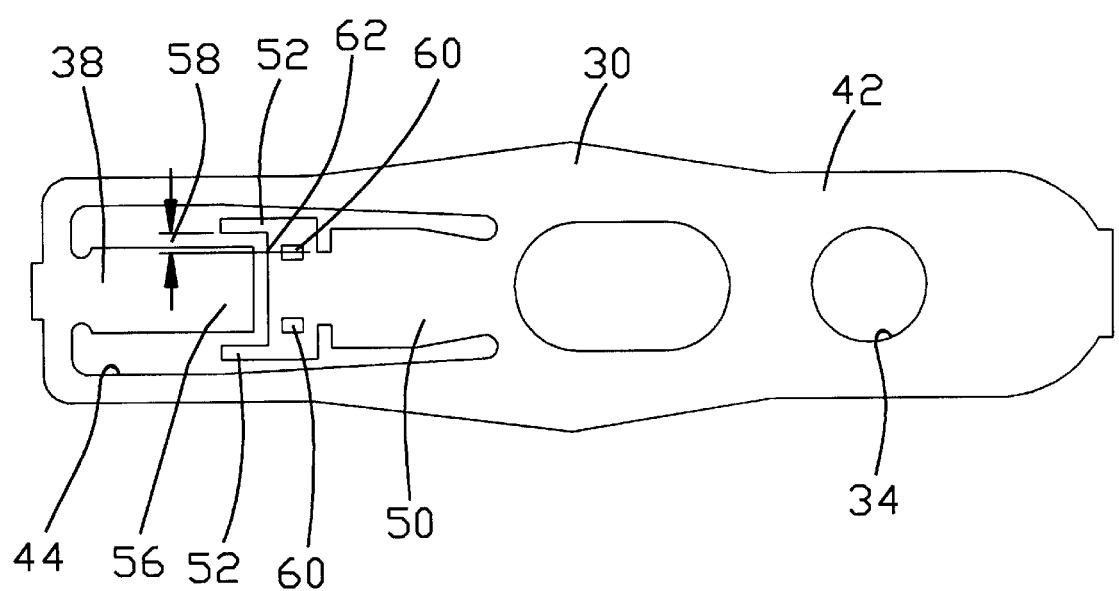
FIG. 2 is a plan view of the flexure of the suspension assembly of FIG. 1 after the flexure and its limiters are defined from the flexure material, but prior to any bending or forming operations.
Figure 3:
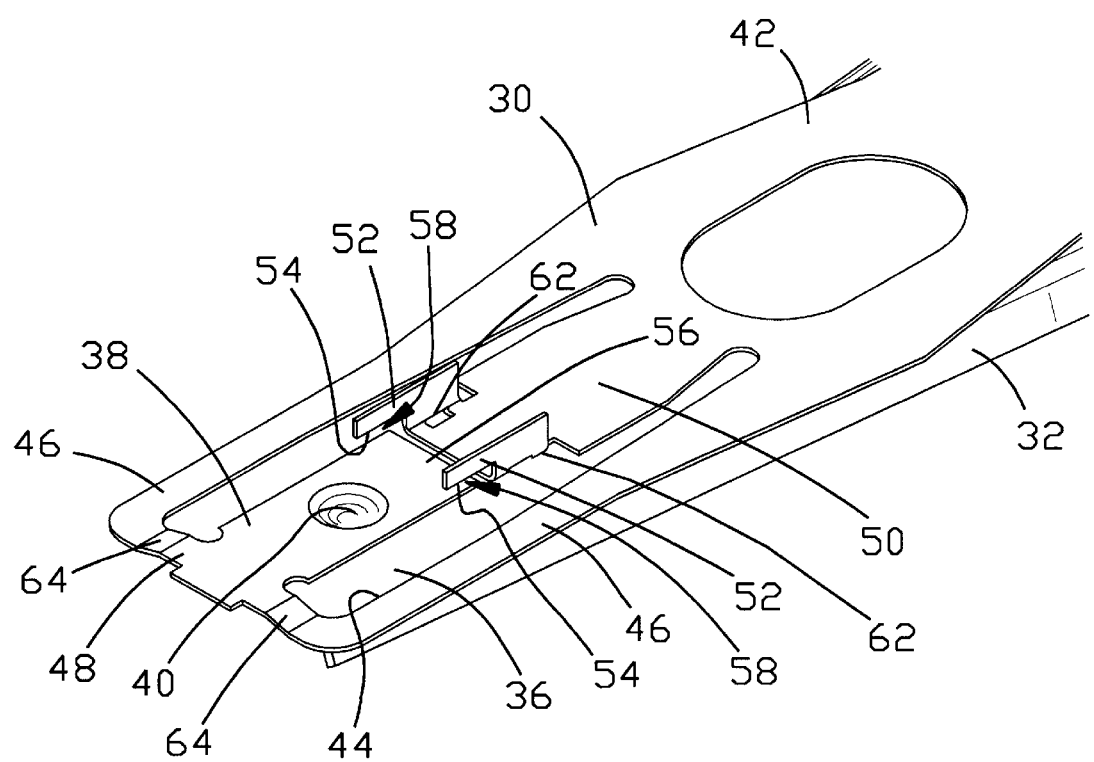
FIG. 3 is an enlarged isometric view of a cantilever portion and the shock limiters of the flexure of FIG. 1.

Referring now to FIGS. 2 and 3, additional details of the flexure 30 will be described. The flexure 30 includes a mounting portion 42 which provides the portion of flexure 30 to be secured to the rigid region 28 of the load beam 20, such as by welding. At the distal end of the flexure 30 an opening 44 is provided which defines the cantilever portion 38 extending within the opening 44. The opening 44 further defines a pair of outer arms 46 connected at the distal end of the flexure 30 by a cross-piece 48, the cross-piece 48 being integrally connected with the cantilever portion 38.

In accordance with the present invention, also provided extending within the opening 44 is an extension portion 50 which is connected with the mounting portion 42 of the flexure 30. A pair of shock limiters 52 are defined within the opening 44 and extending from the sides of the extension portion 50 from the same material as the flexure 30. In FIG. 2, the shock limiters 52 are defined from the material of the flexure 30 and within the same plane thereof, prior to any further forming operation. As shown in FIG. 3, the integral shock limiters 52 are bent along longitudinal bends 62 from the extension portion 50 at an angle of about 90° angle so as to be positioned to oppose a free-end 56 of the cantilever portion 38. More particularly, the shock limiters 52 each include an engagement surface 54 facing a surface of the free end 56 of the cantilever portion 38 by a predetermined gap 58. The surface portions of the free end 56 facing the engagement surfaces 54 comprise stop surfaces which together with the shock limiters 52 provide the limiting function. If the freeend 56 is moved the distance of the gap 58, such as caused by a shock load, engagement surfaces 54 will contact the surface portions of the free end 56 of the cantilever portion 38 and prevent further movement. The gap 58 is predetermined so that the permitted amount of movement of the cantilever portion 38 will not result in permanent yielding of any part of the flexure 30, specifically including the cantilever portion 38, cross-piece 48 and outer arms 46, even when subjected to a shock load. Gap 58 is typically many times larger than the fly height of the slider 14 above a disk surface; however, in addition to preventing deformation of the flexure 30, limiters 52 also eliminate catastrophic edge crashes of the slider 14 and the disk surface but may permit generally planar non-damaging contact.

The shape of flexure 30, including the opening 44 which defines the cantilever portion 38, extension portion 50 and shock limiters 52, is preferably formed by an etching operation. Etching operations, per se, are well known in the industry for precisely defining suspension assembly components including flexures having cantilever portions. Etching processes are preferred in that very precise patterns can be etched from sheet materials to thereby form very precise components.

It is an important aspect of the present invention that the shock limiters 52 can be provided so as to define a predetermined gap 58 with the required preciseness and with ease of manufacturing. The shock limiters 52 are preferably formed by an etching process, as noted above, within the opening 44 of flexure 30. Openings 60 may be provided during the etching process at the connection between the shock limiters 52 and the extension portion 50 to facilitate bending of the shock limiters 52. By this construction, the size of the gap 58 is defined by the distance between the engagement surface 54 of each shock limiter 52 and the bend 62 about which the shock limiters 52 are to be bent by about 90°. Since the bending operation is an independent forming operation from the etching process, the gap 58 can be defined by selecting the location for bend 62 based upon the etched engagement surfaces 54, or by selecting the location of the etched engagement surfaces 54 based upon a given bend location. Because etching is a very precise process, the gap 58 can be exactly defined from the bend 62. The bending operation to form the shock limiters 52, as shown in FIG. 3, is less critical. That is, although the location of the bend 62 is important, the angle of the bend is significantly less critical. In bending operations, manufacturing tolerances within the angle of bend are more difficult to control, particularly, where the part formed, such as flexure 30, comprises a spring metal. A degree of spring back must be compensated for. However, by the present construction and method of making, the manufacturing tolerances of the bend angle forming operation, including potential springback have very little affect on the ultimate gap 58.

Thus, the shock limiters 52 can be bent in position, as shown in FIG. 3, from the FIG. 2 position by a simple forming punch or die (not shown). Such a conventional forming punch or die can accurately position the points of bend by bending the shock limiters 52 over the edge of a forming block (not shown).

In order to space the cantilever portion 38 from the load portion 36 of the rigid region 28 of load beam 20 by the height of dimple 40, bends 64 are also preferably provided within the cross piece 48, as well known. The bends 64 and dimple 40 can also be conventionally formed, such as by using forming punches and dies.

Figure 4:
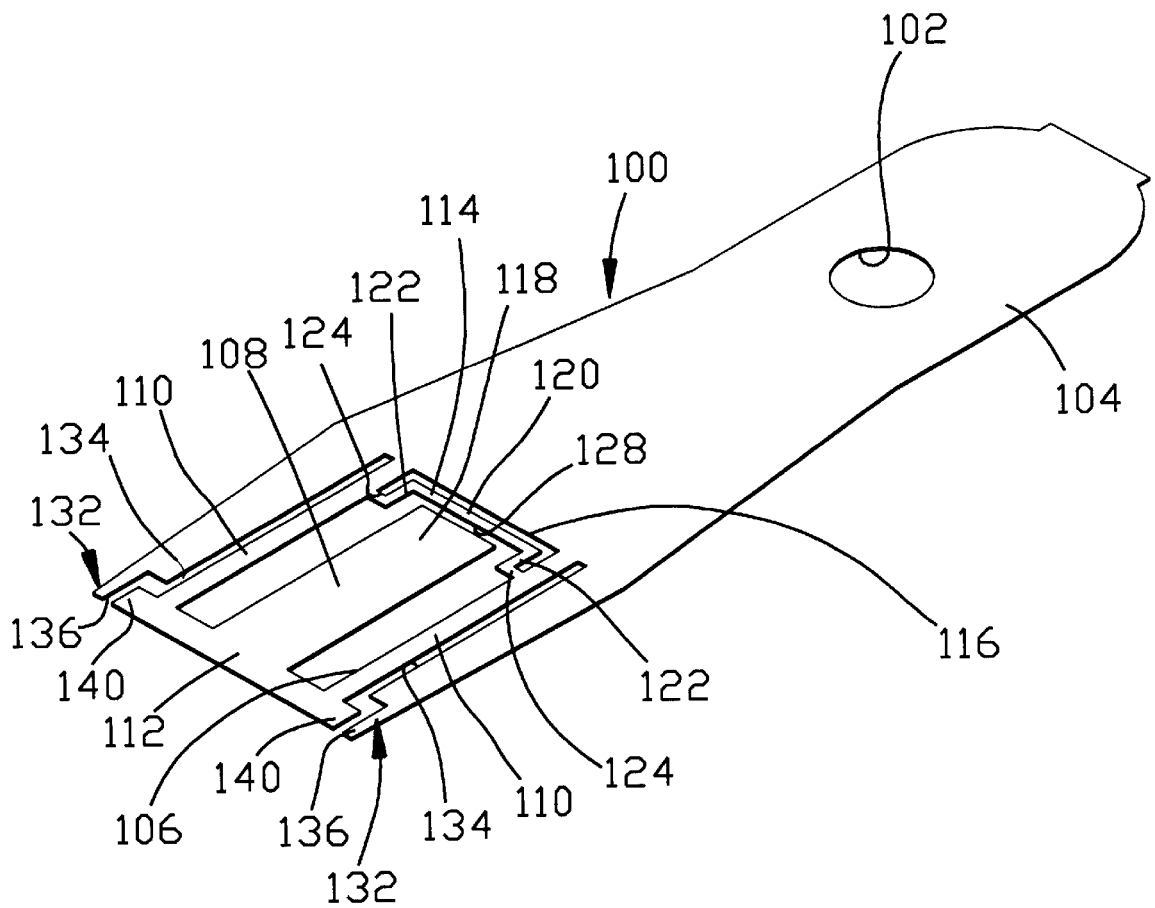
FIG. 4 is an isometric view of a second embodiment of a flexure in accordance with the present invention after the flexure with its limiters are defined, but prior to any bending or forming operations.

Referring now to FIG. 4, a second embodiment of a flexure 100 is illustrated. The flexure 100 can be fixed to a rigid portion 28 of a load beam 20, in the same manner as in the embodiment of FIG. 1. Like the flexure 30 described above, flexure 100 includes an alignment hole 102 to control accurate placement of flexure 100 to the load beam 20.

Flexure 100 comprises a mounting portion 104 for connection to the rigid region 28 of a load beam 20, such as by welding. At the distal end of the flexure 100, an opening 106 is provided and within which a cantilever portion 108 extends. Moreover, the opening 106 defines outer arms 110 and a crosspiece 112. The cantilever portion 108 is an extension within opening 106 from the crosspiece 112.

Figure 5:
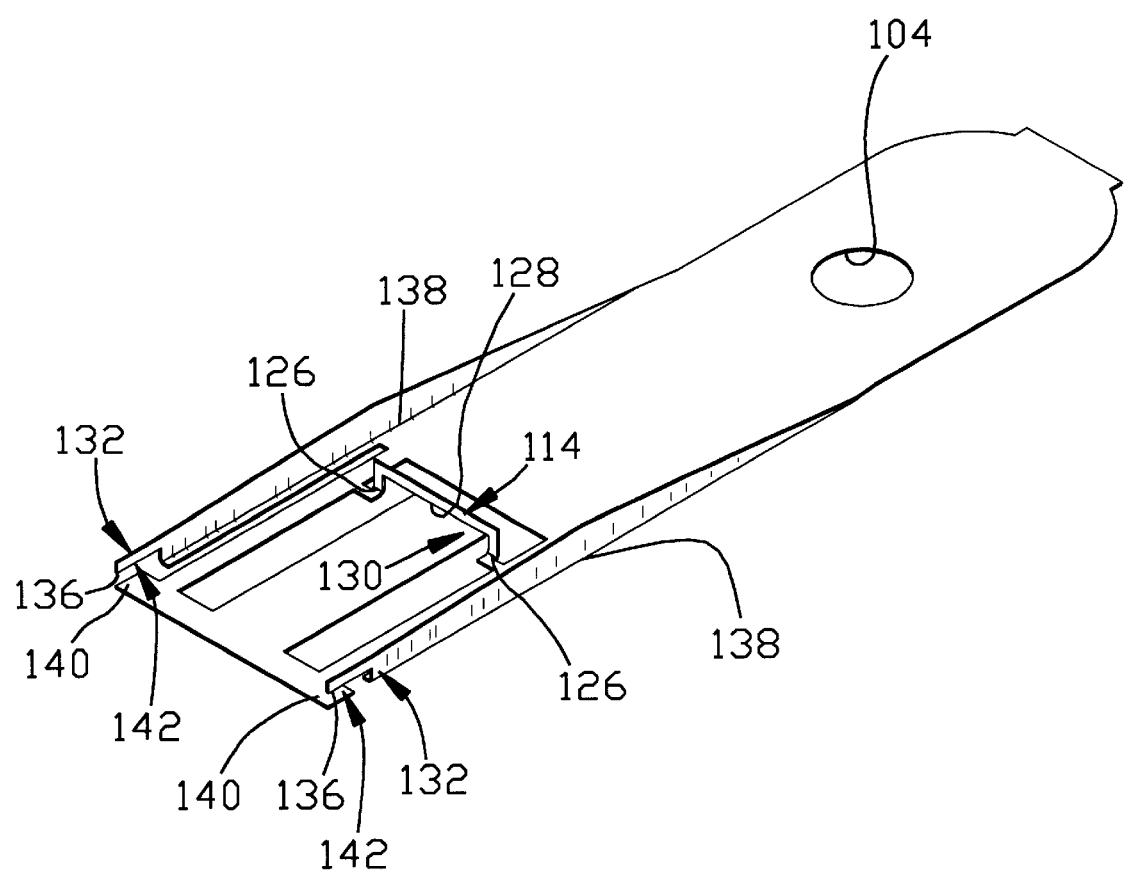
FIG. 5 is an isometric view of the flexure of FIG. 4 having shock limiters formed to act on movable free ends of plural cantilever portions of the flexure.

Further in accordance with the present invention, a first shock limiter 114 is formed in the flexure 100 within the plane of the flexure 100 and of the same material just adjacent the cantilever portion 108. To define the shock limiter 114 from the same material as the flexure 100, a U-shaped slot 116 is provided through the flexure material just longitudinally inward from the free end 118 of the cantilever portion 108. The shock limiter 114 is defined between the slot 116 and the opening 106 to have a cross portion 120, longitudinal legs 122 at each end of the cross portion 120, and connecting portions 124 from the legs 122 to the outer arms 110. As seen in FIG. 5, bends 126 are provided within the leg portions 122 so that an engagement surface 128 of the cross portion 120 is positioned to oppose and limit movement of the free end 118 of the cantilever portion 108 of flexure 100. Like the FIGS. 1–3 embodiment, a single bending operation forms the shock limiter 114 in operational position. Moreover, the gap 130 defined between the engagement surface 128 and the opposed stop surface of the free end 118 is defined primarily based on the operation of defining the opening 106 and slot 116 by an etching operation. Again, tolerances relating to the degree of the bending operation do not significantly affect the predetermined gap 130.

The flexure 100 shown in FIGS. 4 and 5 includes a second set of shock limiters 132 which are also defined from the material of the flexure 100. Shock limiters 132 act to limit movement of the crosspiece 112 to the extent that it also acts as a cantilever portion of the flexure 100 connected by way of the outer arms 110. Shock limiters 132 are formed by providing additional slots 134 extending longitudinally from the distal end of flexure 100 and adjacent to the sides of the opening 106. By this construction, the outer arms 110 are more resilient, permitting greater flexibility of the cantilever portion 108 by providing a degree of movement of the crosspiece 112. Shock limiters 132 include engagement surfaces 136 which when the shock limiters 132 are bent into position at bend lines 138, are opposed to side portions 140 of the crosspiece 112. Movement of the crosspiece 112 toward the engagement surfaces 136 is limited to the extent of a gap 142, the predetermined distance of which is again defined primarily by the definition of the shock limiters 132 from the material of flexure 100. According to this embodiment, the cantilever portion 108 provides a surface for mounting a slider thereto, and interacts with the distal load portion 36 of a load beam 20. Moreover, a dimple may be provided on the cantilever portion 108 or alternatively, from the load portion 36. Pitch and roll movements of a slider mounted to the cantilever portion 108 are thereby permitted.

Figure 6:
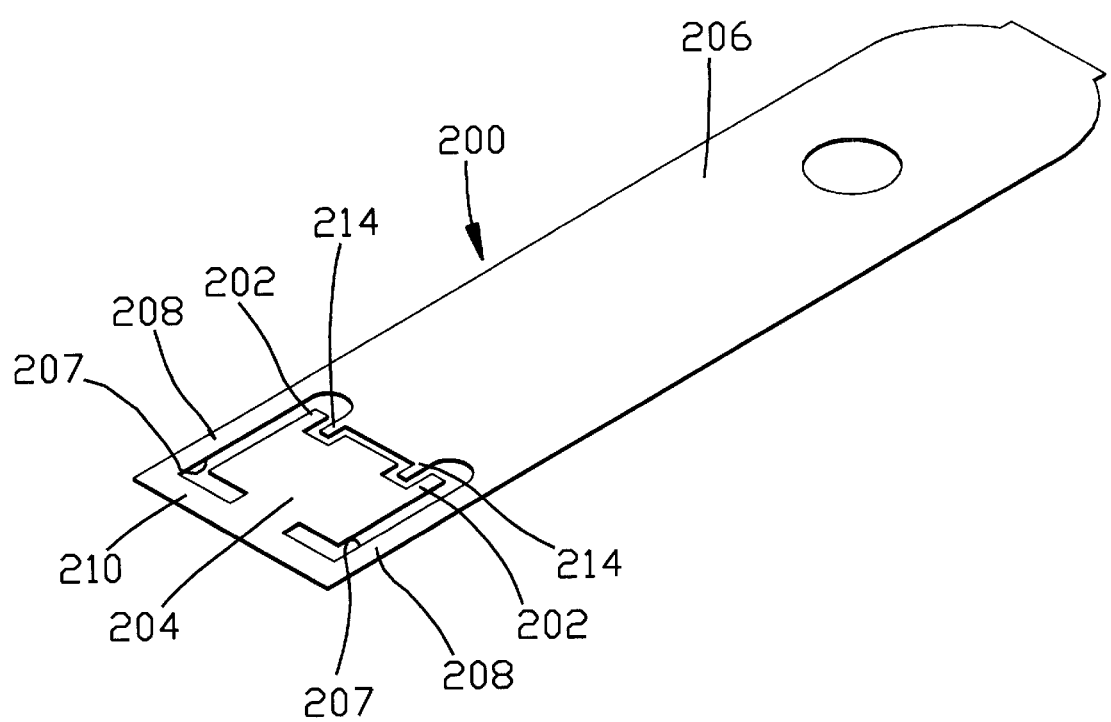
FIG. 6 is a third embodiment of a flexure in accordance with the present invention after the flexure and its limiters are defined, but prior to any bending or forming operations, wherein the shock limiters are defined extending from the free end of the cantilever portion of the flexure to oppose stop surfaces on the flexure.
Figure 7:
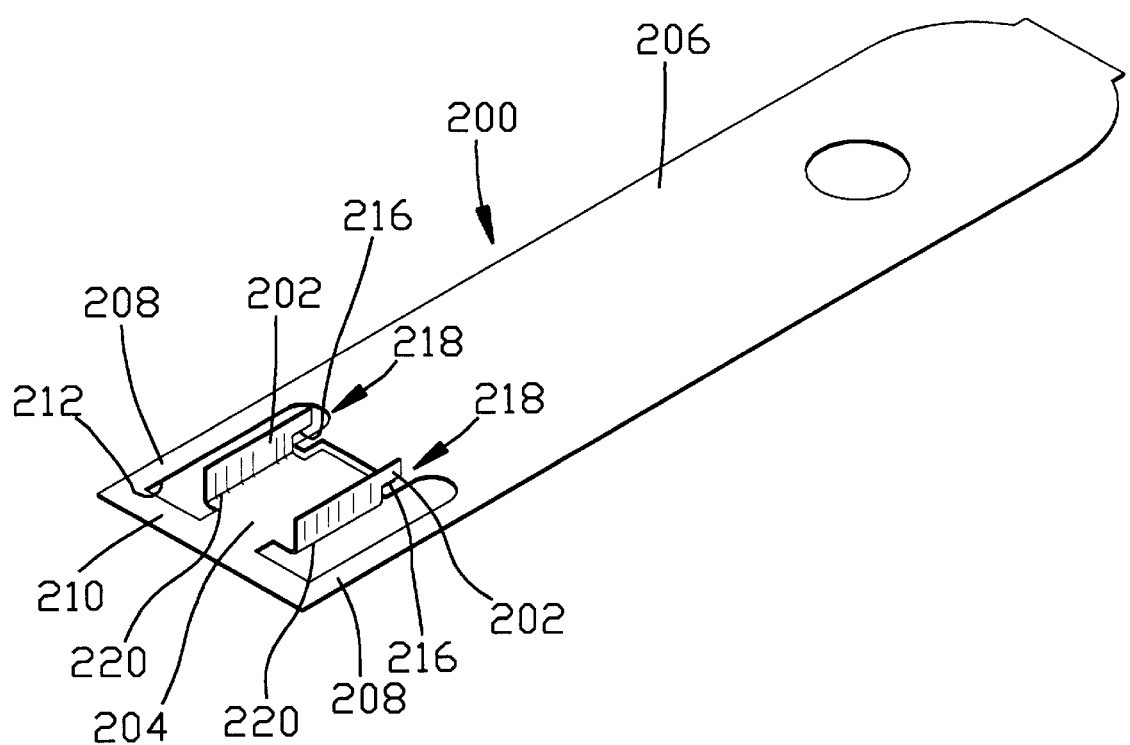
FIG. 7 is an isometric view of the flexure of FIG. 6 after the shock limiters have been formed as part of the cantilever portion of the flexure by a bending operation.

In FIGS. 6 and 7, a third embodiment of a flexure 200 is illustrated. The main difference between FIGS. 6 and 7 embodiment and the FIGS. 1–3 embodiment is that shock limiters 202 are formed as part of a cantilever portion 204, instead of on an extension of the flexure. Flexure 200 includes a mounting portion 206 and an opening 207 defining outer arms 208, a crosspiece 210 and the cantilever portion 204 connected from the crosspiece 210. The opening 207 is provided, such as by etching for the reasons discussed above, for defining the outer arms 208, crosspiece 210, cantilever portion 204 and shock limiters 202. Additionally, stop surfaces 214 are preferably provided longitudinally extending within the opening 207 from the mounting portion 206 so that when the shock limiters 202 are formed into position by a single 90° bend, as shown in FIG. 7, the stop surfaces 214 are opposed to an engagement surface 216 of each of the shock limiters 202. Predetermined gaps 218 are defined between the engagement surfaces 216 and the stop surfaces 214, again primarily depending on the definition of the shock limiters 202 from the material of the flexure 200 and the position of bend lines 220.

According to this embodiment, a slider is to be mounted to the cantilever portion 204 on the side thereof opposite to the shock limiters 202. It is the purpose of the shock limiters 202 to prevent movement of the slider toward a confronting disk surface to prevent crashing of the slider with the disk surface, as well as to prevent deformation of the flexure 200. A dimple may also be provided on the cantilever portion 204, or may be provided as a part of a loading portion of a load beam to which the flexure 200 may be connected. In the case of the FIG. 6–7 embodiment, the load beam would need a load portion (not shown) to engage the cantilever portion 204 from the side thereof having the shock limiters 202.

Figure 8:
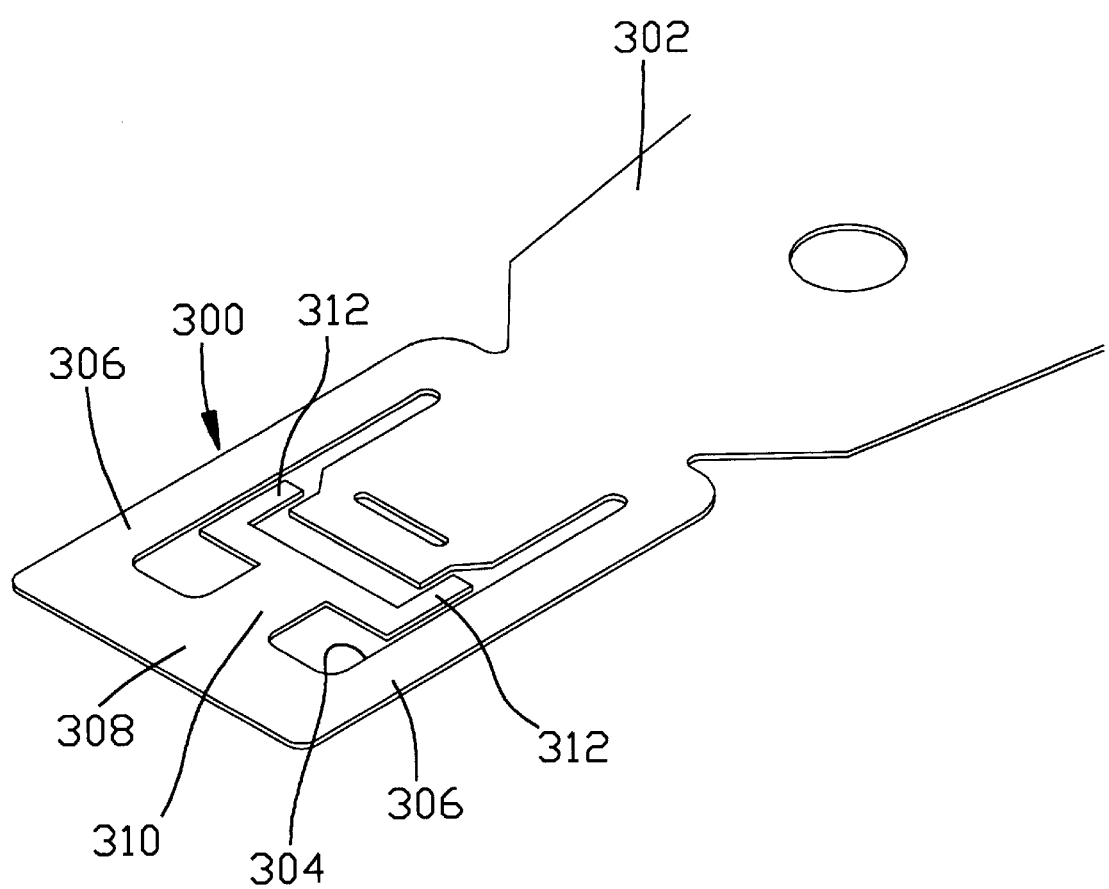
FIG. 8 is a fourth embodiment of a flexure in accordance with the present invention of the type that is formed integral with the load beam and having a cantilever portion to be connected to a head slider and wherein shock limiters are shown prior to any bending or forming operation as a part of the cantilever portion.
Figure 9:
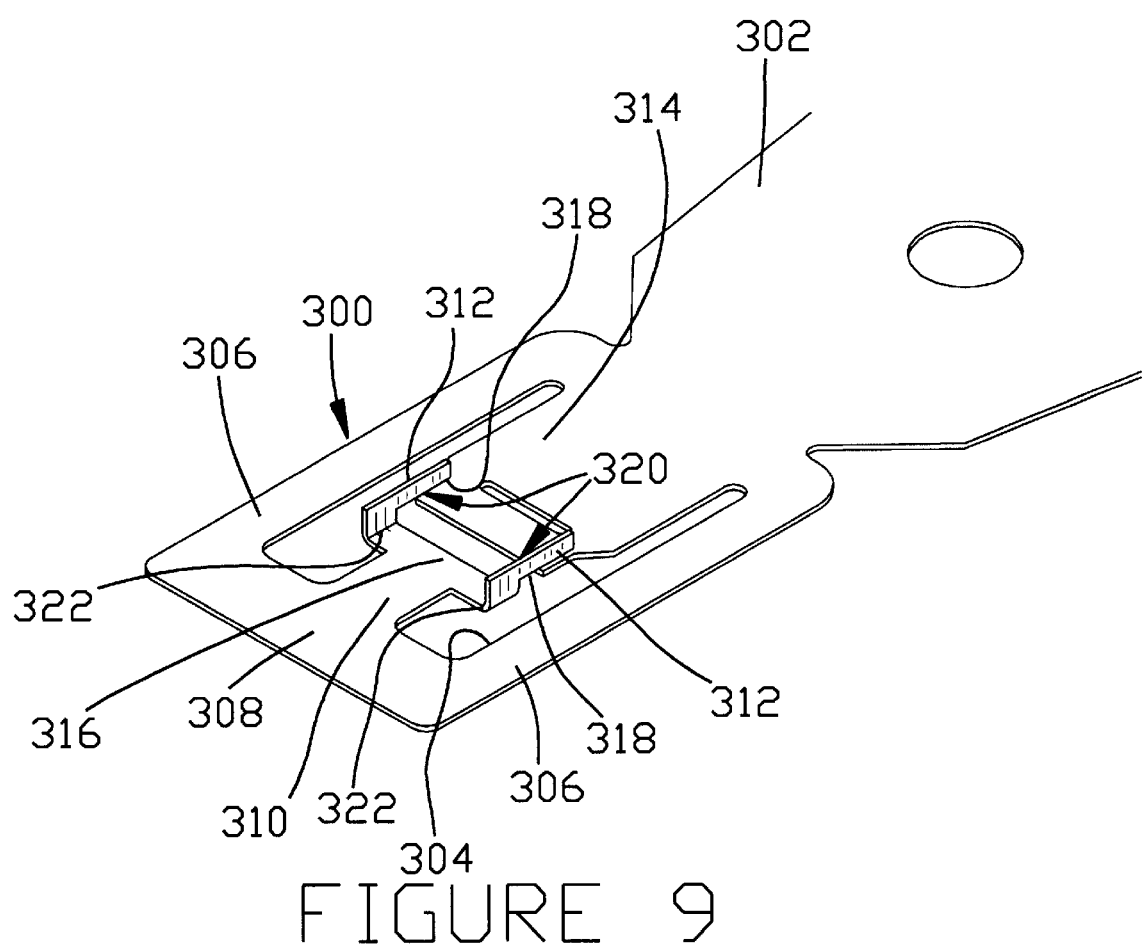
FIG. 9 is a isometric view of the flexure of FIG. 8 showing the shock limiters formed as part of the cantilever portion after a bending operation.

A fourth embodiment is illustrated in FIGS. 8 and 9 of a flexure 300 which is provided integrally with a load beam 302 at its distal end. Flexures integrated with the load beam design of this type are known, as shown for example in U.S. Pat. No. 5,428,490, the disclosure of which is incorporated herein by reference.

The flexure 300 includes an opening 304 defining outer arms 306, a crosspiece 308, a cantilever portion 310 and shock limiters 312. Also defined is an extension portion 314, extending within the opening 304 from the load beam 302. According to this construction, the cantilever portion 310 is to be mounted to a only a portion of a slider mounting surface while the extension portion 314 is to also engage with and provide a desired load to the mounting surface of the slider. A dimple may be provided on the bottom surface of the extension portion 314 as viewed in FIGS. 8 and 9 so that the slider mounting surface can permit movement of the slider in its pitch and roll directions as controlled by the dimple and permitted by the movement of the cantilever portion 310.

The movement of the free end 316 of the cantilever portion 310 is limited by the shock limiters 312 in the direction of movement of the slider toward a disk confronting surface when in use. The shock limiters 312 include engagement surfaces 318 that face stop surface portions of the extension portion 314 to define a gap 320 therebetween for limiting movement of the free end 316 of the cantilever portion 310. Like the above described embodiments, a single bend line 322 is needed to define each of the shock limiters 312 in position defining gaps 320. The gap 320 being primarily based upon the definition of the shock limiters 312 from the material of the flexure 300, such as by an etching process, and the position of the bend lines 322.

As is exemplified by the above-described embodiments, shock limiters in accordance with the present invention can be provided in a variety of ways and may be provided from either the cantilever portion of the flexure to act against another portion of the flexure or oppositely from a portion of the flexure to act on the free end of the cantilever portion. In any case, the shock limiters and stop surfaces in accordance with the present invention are contained with the flexure, whether provided as a separate element or formed integrally with the load beam, and the shock limiters are defined by the pattern of the flexure. The advantages include a simplified assembly of the components, as well as making bending tolerances less significant. Another advantage of a flexure contained limiters is that, with reference to FIG. 10, the slider movement is limited no matter whether the suspension assembly 10 is positioned above the disk 16 or is parked to the side, as shown. The shock limiters will limit the movement of the slider and cantilever portion of the flexure so as to prevent deformation of the flexure under shock load.

I claim:

1. A suspension assembly for supporting a head slider at a fly height above a disk surface during operation within a rigid disk drive comprising:

a load beam having an actuator mounting region a loading region at a distal end of said load beam a rigid region between said actuator mounting region and said loading region and a spring region between said actuator mounting region and said rigid region for providing a load force to the head slider in use;

a flexure at the distal end of the load beam, the flexure comprising a cantilever portion having a head slider mounting surface facing in a first direction toward the disk surface and a free end that is movable during flexure of said cantilever portion;

limiter means for limiting the range of movement of said free end of said cantilever portion in the direction of movement of said slider mounting surface in said first direction away from said load beam, said limiter means comprising a limiter element and a stop surface with one of said limiter element and said stop surface provided at said free end of said cantilever portion and each comprising an integrally formed element of said flexure.

2. The suspension assembly of claim 1, wherein said limiter element comprises an engagement surface spaced from said stop surface by a predetermined gap and said limiter element is integrally connected to said flexure by a bend.

3. The suspension assembly of claim 2, wherein said limiter element is connected to said flexure by a single bend of about 90 degrees.

4. The suspension assembly of claim 3, wherein said limiter means comprises a plurality of limiter elements and stop surfaces, each having an engagement surface spaced from a stop surface by the same predetermined gap.

5. The suspension assembly of claim 2, wherein said flexure comprises a separately constructed part of said load beam and is secured to said rigid region of said load beam, and said load beam further comprises a load portion for engagement with a surface of said cantilever portion facing opposite than said slider mounting surface.

6. The suspension assembly of claim 5, wherein said cantilever portion is provided within an opening of said flexure and extends from a distal end of said flexure toward said actuator mounting region of said load beam and said limiter element is connected to a mounting region of said flexure that is closer to said actuator mounting region of said load beam than said free end of said cantilever portion.

7. The suspension assembly of claim 5, wherein said cantilever portion is provided within an opening of said flexure and extends from a distal end of said flexure toward said actuator mounting region of said load beam and said limiter element is connected to said cantilever portion at said free end so as to oppose said stop surface provided on a mounting region of said flexure that is closer to said actuator mounting region of said load beam than said free end of said cantilever portion.

8. The suspension assembly of claim 6, wherein said cantilever portion is connected to a cross-piece portion of said flexure, said cross-piece being in turn connected with said mounting region of said flexure by at least one outer arm so as to permit flexure of said crosspiece in combination with flexure of said cantilever portion, and further comprising a second limiter means for limiting the range of movement of said cross-piece in the same direction as the first limiter means.

9. The suspension assembly of claim 8, wherein said second limiter means comprises a limit element connected to said mounting region of said flexure by a bend and includes an engagement surface opposed to a stop surface of said cross-piece.

10. The suspension assembly of claim 2, wherein said flexure is formed integrally with said rigid region of said load beam and said cantilever portion is provided within an opening of said flexure and extends from a distal end of said flexure toward said actuator mounting region of said load beam and said limiter element is connected to said cantilever portion at said free end so as to oppose said stop surface provided on a mounting region of said flexure that is closer to said actuator mounting region of said load beam than said free end of said cantilever portion.

11. A flexure for use in a suspension assembly for supporting a head slider to fly over a disk surface during operation within a rigid disk drive, the suspension assembly of the type having a load beam having an actuator mounting region, a loading region at a distal end of said load beam a rigid region between said actuator mounting region and said loading region and a spring region between said actuator mounting region and said rigid region for providing a load force to the head slider in use comprising:

a mounting region for connection to the rigid region of a load beam;

a cantilever portion connected with said mounting region and having a free end that is movable during flexure of said cantilever portion and a head slider mounting surface facing in a first direction toward the disk surface;

limiter means for limiting the range of movement of said free end of said cantilever portion in said first direction comprising a limiter element and a stop surface with one of said limiter element and said stop surface provided at said free end of said cantilever portion and the other provided on said mounting region, each comprising an integrally formed element of said flexure.

12. The flexure of claim 11, wherein said limiter element comprises an engagement surface spaced from said stop surface by a predetermined gap and said limiter element is integrally connected to said flexure by a bend.

13. The flexure of claim 12, wherein said limiter element is connected to said flexure by a single bend of about 90 degrees.

14. The flexure of claim 13, wherein said limiter means comprises a plurality of limiter elements and stop surfaces, each having an engagement surface spaced from a stop surface by the same predetermined gap.

15. The flexure of claim 14, wherein said cantilever portion is provided within an opening of said flexure and extends proximally from a distal end of said flexure and said limiter element is connected to said mounting region of said flexure.

16. The flexure of claim 14, wherein said cantilever portion is provided within an opening of said flexure and extends proximally from a distal end of said flexure and said limiter element is connected to said cantilever portion at said free end so as to oppose said stop surface provided on the mounting region of said flexure.

17. The flexure of claim 15, wherein said cantilever portion is connected to a cross-piece portion of said flexure, said cross-piece being in turn connected with said mounting region of said flexure by at least one outer arm so as to permit flexure of said cross-piece in combination with flexure of said cantilever portion, and further comprising a second limiter means for limiting the range of movement of said cross-piece in the same direction as the first limiter means.

18. The flexure of claim 17, wherein said second limiter means comprises a limit element connected to said mounting region of said flexure by a bend and includes an engagement surface opposed to a stop surface of said cross-piece.

* * * * *